(12) United States Patent
Chikamori et al.

(10) Patent No.: US 12,008,354 B2
(45) Date of Patent: Jun. 11, 2024

(54) UPDATE METHOD OF MAP DATA AND MAP INFORMATION SYSTEM

(71) Applicant: HONDA MOTOR CO., LTD., Tokyo (JP)

(72) Inventors: Hidetoshi Chikamori, Saitama (JP); Kazumasa Nakamura, Saitama (JP); Hitoshi Konishi, Saitama (JP); Takuji Harayama, Saitama (JP); Tomoaki Masakawa, Tokyo (JP); Naofumi Aso, Saitama (JP); Ryo Matsuzawa, Tokyo (JP); Zhaoqi Wang, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 206 days.

(21) Appl. No.: 17/571,034

(22) Filed: Jan. 7, 2022

(65) Prior Publication Data

US 2022/0222060 A1 Jul. 14, 2022

(30) Foreign Application Priority Data

Jan. 12, 2021 (JP) ................................. 2021-002920

(51) Int. Cl.
*G06F 9/445* (2018.01)
*G06F 8/65* (2018.01)
(52) U.S. Cl.
CPC ..................................... *G06F 8/65* (2013.01)
(58) Field of Classification Search
CPC .... G06F 16/29; G06F 8/65; G06F 2221/2111; G08G 1/205; G08G 1/096827; G08G 1/0969; G08G 1/165

USPC .................................................. 717/168–178
See application file for complete search history.

(56) References Cited

U.S. PATENT DOCUMENTS

| 2001/0020213 | A1  | 9/2001 | Hatano |              |
|--------------|-----|--------|--------|--------------|
| 2003/0083809 | A1  | 5/2003 | Hatano |              |
| 2005/0060069 | A1* | 3/2005 | Breed  | ..... G08G 1/166 |
|              |     |        |        | 701/408      |
| 2019/0205115 | A1* | 7/2019 | Gomes  | ..... H04W 4/50 |

(Continued)

FOREIGN PATENT DOCUMENTS

| JP | 2001250194 A | 9/2001 |
|----|--------------|--------|
| JP | 2008309677 A | 12/2008 |

(Continued)

OTHER PUBLICATIONS

Notice of Reasons for Refusal for Patent Application JP 2021-002920 dated Sep. 6, 2022; 8 pp.

*Primary Examiner* — Chuck O Kendall
(74) *Attorney, Agent, or Firm* — Armstrong Teasdale LLP (57) ABSTRACT

In an update method of map data executed by a map information system provided in a vehicle, wherein the map data includes multiple pieces of block data separated corresponding to blocks on a map and stored in a storage device of the map information system, the map information system decides priority orders of pieces of block data to be updated based on at least one of a position of an own vehicle, a route to a destination, and a passage history, communicates with a map server having a latest version of the map data and downloads update data of the pieces of block data to be updated from the map server in accordance with the priority order, and updates the pieces of block data stored in the storage device based on the downloaded update data.

6 Claims, 6 Drawing Sheets

(56) References Cited

U.S. PATENT DOCUMENTS

| | | | | |
|---|---|---|---|---|
| 2021/0003403 A1* | 1/2021 | Wheeler | ................ | G06V 20/56 |
| 2021/0004363 A1* | 1/2021 | Bailly | ..................... | G06T 17/05 |

FOREIGN PATENT DOCUMENTS

| | | | |
|---|---|---|---|
| JP | 2015001471 A | 1/2015 | |
| JP | 2020041936 A | 3/2020 | |

\* cited by examiner

UPDATE METHOD OF MAP DATA AND MAP INFORMATION SYSTEM

TECHNICAL FIELD

The present invention relates to an update method of map data and a map information system that executes the update method of map data.

BACKGROUND ART

JP2008-309677A discloses a car navigation device for a vehicle that communicates with a map server and downloads the latest map data. The car navigation device of JP2008-309677A assigns priority degrees to pieces of map data and downloads the pieces of map data in order starting from the piece of map data assigned the highest priority degree. The car navigation device of JP2008-309677A sets high priority degrees for pieces of map data corresponding to regions (blocks) near the position of the own vehicle.

However, even if a region is near the own vehicle position, there may be a case where the map data of the region is unnecessary when it is expected that the own vehicle will not travel in the region. This is particularly problematic when the map data is high accuracy map data. Since the high accuracy map data has a large data size, if unnecessary map data is downloaded, it will undesirably reduce the usable space of the storage device of the map information system provided in the vehicle.

SUMMARY OF THE INVENTION

In view of the foregoing background, an object of the present invention is to provide an update method of map data that can reduce the storage space for the map data and a map information system that executes the update method of map data.

To achieve the above object, one aspect of the present invention provides an update method of map data executed by a map information system (1) provided in a vehicle, wherein the map data includes multiple pieces of block data separated so as to correspond to blocks on a map and stored in a storage device (52) of the map information system, and wherein the map information system decides priority orders of pieces of block data to be updated based on at least one of a position of an own vehicle, a route to a destination, and a passage history, communicates with a map server having a latest version of the map data and downloads update data of the pieces of block data to be updated from the map server in accordance with the priority order, and updates the pieces of block data stored in the storage device based on the downloaded update data.

According to this aspect, since the pieces of block data to be updated are selected based on at least one of the position of the own vehicle, the route to the destination, and the passage history, the size of the pieces of block data stored in the storage device can be reduced.

In the above aspect, preferably, the map data is a high accuracy map including lane information.

According to this aspect, even when the size of the map data is large, the size of the map data stored in the storage device can be reduced.

In the above aspect, preferably, the map information system deletes, based on the passage history, pieces of block data corresponding to map regions in which a passage frequency is less than or equal to a prescribed determination value.

According to this aspect, it is possible to increase the free space of the storage device by deleting part of the map data that is not used. Also, the capacity of the storage device can be reduced and this enables reduction in cost.

In the above aspect, preferably, the map information system deletes, based on the passage history, pieces of block data corresponding to map regions in which a passage frequency is less than or equal to a prescribed determination value and which do not include the route to the destination.

According to this aspect, it is possible to increase the free space of the storage device by deleting part of the map data that is not used. Also, the capacity of the storage device can be reduced and this enables reduction in cost.

In the above aspect, preferably, when, during download of a piece of block data, the map information system determines, based on the position of the own vehicle, that the own vehicle will not pass a region corresponding to the piece of block data that is being downloaded within a prescribed time period from a current time, the map information system cancels the download of the piece of block data that is being downloaded.

According to this aspect, by canceling download of the pieces of block data that are determined not to be used, it is possible to maintain the free space of the storage device.

In the above aspect, preferably, each piece of block data includes version information, and the map information system determines necessity of update based on the version information of the pieces of block data stored in the storage device and the version information of the pieces of block data stored in the map server and performs download from the map server when it is determined that the update is necessary.

According to this aspect, the amount of communication between the map information system and the map server can be reduced.

Another aspect of the present invention provides a map information system (1) comprising: a storage device (52) that stores map data including multiple pieces of block data separated so as to correspond to blocks on a map; and a map acquisition unit (51) that decides priority orders of pieces of block data to be updated based on at least one of a position of an own vehicle, a route to a destination, and a passage history, communicates with a map server (3) having a latest version of the map data, downloads latest pieces of block data from the map server in accordance with the priority orders, and updates the pieces of block data stored in the storage device based on the downloaded pieces of block data.

According to this aspect, since the pieces of block data to be updated are selected based on at least one of the position of the own vehicle, the route to the destination, and the passage history, the size of the pieces of block data stored in the storage device can be reduced.

According to the foregoing configuration, it is possible to provide an update method of map data that can reduce the storage space for the map data and a map information system that executes the update method of map data.

DETAILED DESCRIPTION OF THE INVENTION

In the following, a map information system according to an embodiment of the present invention will be described with reference to the drawings.

Figure 1:
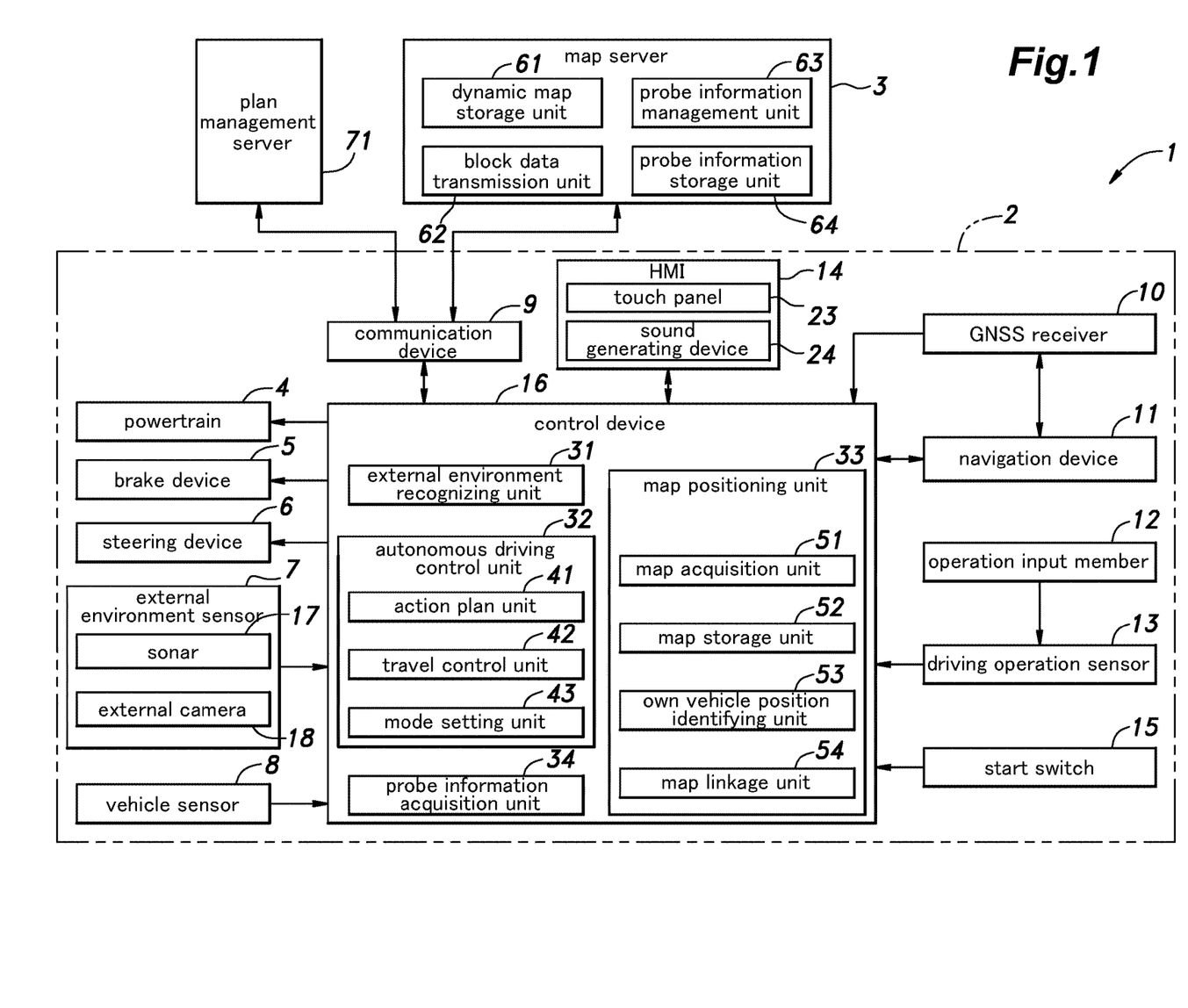
FIG. 1 is a configuration diagram of a map information system according to an embodiment of the present invention.

As shown in FIG. 1, a map information system 1 includes a vehicle system 2 installed in a vehicle and a map server 3 connected with the vehicle system 2 via a network.

(Vehicle System)

First, the vehicle system 2 will be described. The vehicle system 2 includes a powertrain 4, a brake device 5, a steering device 6, an external environment sensor 7, a vehicle sensor 8, a communication device 9, a GNSS receiver 10, a navigation device 11, an operation input member 12, a driving operation sensor 13, a human machine interface (HMI) 14, a start switch 15, and a control device 16. These components of the vehicle system 2 are connected to each other so that signals can be transmitted therebetween via communication means such as a Controller Area Network (CAN).

The powertrain 4 is a device configured to apply a driving force to the vehicle. The powertrain 4 includes at least one of an internal combustion engine, such as a gasoline engine and a diesel engine, and an electric motor. The brake device 5 is a device configured to apply a brake force to the vehicle. For example, the brake device 5 includes a brake caliper configured to press a brake pad against a brake rotor and an electric cylinder configured to supply an oil pressure to the brake caliper. The brake device 5 may include a parking brake device configured to restrict rotations of wheels via a wire cable. The steering device 6 is a device for changing the steering angle of the wheels. For example, the steering device 6 includes a rack-and-pinion mechanism configured to steer the wheels and an electric motor configured to drive the rack-and-pinion mechanism. The powertrain 4, the brake device 5, and the steering device 6 are controlled by the control device 16.

The external environment sensor 7 is a sensor that detects electromagnetic waves, sound waves, and the like from the surroundings of the vehicle to detect an object outside the vehicle. The external environment sensor 7 includes sonars 17 and external cameras 18. The external environment sensor 7 may include a millimeter wave radar and/or a laser lidar. The external environment sensor 7 outputs a detection result to the control device 16.

Each sonar 17 consists of a so-called ultrasonic sensor. The sonar 17 emits ultrasonic waves to the surroundings of the vehicle and captures the ultrasonic waves reflected by an object around the vehicle thereby to detect a position (distance and direction) of the object. Multiple sonars 17 are provided at each of a rear part and a front part of the vehicle.

The external cameras 18 are devices configured to capture images around the vehicle. Each external camera 18 consists of a digital camera using a solid imaging element, such as a CCD or a CMOS, for example. Each external camera 18 may be a stereo camera or a monocular camera. The external cameras 18 may include a front camera for capturing an image in front of the vehicle, a rear camera for capturing an image to the rear of the vehicle, and a pair of side cameras for capturing images on left and right side of the vehicle.

The vehicle sensor 8 is a sensor that measures a state of the vehicle. The vehicle sensor 8 includes a vehicle speed sensor configured to detect the speed of the vehicle, an acceleration sensor configured to detect acceleration of the vehicle, a yaw rate sensor configured to detect the angular velocity around a vertical axis of the vehicle, and a direction sensor configured to detect the direction of the vehicle. For example, the yaw rate sensor consists of a gyro sensor. The vehicle sensor 8 may include a tilt sensor configured to detect the tilt of the vehicle body and a wheel speed sensor configured to detect the rotation speed of one or more wheels.

The communication device 9 mediates communication between the control device 16 and devices outside the vehicle (for example, the map server 3). The communication device 9 includes a router for connecting the control device 16 to the Internet. The communication device 9 preferably has a wireless communication function that mediates wireless communication between the control device 16 and a control device 16 of another vehicle around the own vehicle and/or wireless communication between the control device 16 and roadside devices on the road.

The GNSS receiver 10 receives a signal (hereinafter referred to as a "GNSS signal") from multiple satellites constituting a global navigation satellite system (GNSS). The GNSS receiver 10 outputs the received GNSS signal to the navigation device 11 and the control device 16.

The navigation device 11 is configured by a computer made of known hardware. The navigation device 11 identifies the current position (latitude and longitude) of the vehicle based on the latest travel history and/or the GNSS signal output from the GNSS receiver 10. The navigation device 11 is provided with a RAM, a HDD, an SSD or the like for storing data related to the road information in the areas and/or countries in which the vehicle may travel (hereinafter referred to as "navigation map data").

The navigation device 11 sets a route from the current position of the vehicle to the destination input by an occupant of the vehicle based on the GNSS signal and the navigation map data and outputs the route to the control device 16. When the vehicle starts traveling, the navigation device 11 provides the occupant with a route guide to the destination.

The navigation device 11 holds, as the information related to the roads on the map, information regarding points (nodes) on the roads and line segments (links) connecting the nodes. Preferably, the nodes held in the navigation device 11 are provided at feature points such as intersections and merge points, for example. The navigation device 11 stores the distance between the nodes connected by each link in association with the information of each link. The navigation device 11 acquires an appropriate route from the current position of the vehicle to the destination based on the distances between the nodes and outputs information indicating the route to the control device 16. The output information indicating the route includes the points (nodes) on the roads corresponding to the route and the links corresponding to the vectors connecting the nodes.

The operation input member 12 is provided in a vehicle cabin to receive an input operation performed by the occupant to control the vehicle. The operation input member 12 includes a steering wheel, an accelerator pedal, and a brake pedal. The operation input member 12 may further include a shift lever, a parking brake lever, a turn signal lever, or the like.

The driving operation sensor 13 is a sensor that detects an operation amount of the operation input member 12. The driving operation sensor 13 includes a steering angle sensor configured to detect an operation amount of the steering wheel, an accelerator sensor configured to detect an operation amount of the accelerator pedal, and a brake sensor configured to detect an operation amount of the brake pedal. The driving operation sensor 13 outputs a detected operation amount to the control device 16. The driving operation sensor 13 may include a grasp sensor configured to detect grasping of the steering wheel by the occupant. For example, the grasp sensor is constituted of an electrostatic capacitance sensor provided on an outer circumferential portion of the steering wheel.

The HMI 14 notifies the occupant of various kinds of information by display and/or voice and receives an input operation by the occupant. The HMI 14 includes, for example, a touch panel 23 that includes a liquid crystal display or an organic EL display and is configured to receive the input operation by the occupant and a sound generation device 24 such as a buzzer or a speaker. The HMI 14 is capable of displaying a driving mode switching button on the touch panel 23. The driving mode switching button is a button for receiving an operation of the occupant to switch the driving mode (for example, an autonomous driving mode and a manual driving mode) of the vehicle.

The HMI 14 also functions as an interface that mediates output and input to and from the navigation device 11. Namely, when the HMI 14 receives a destination input operation by the occupant, the navigation device 11 starts setting a route to the destination. Also, when the navigation device 11 performs the route guidance to the destination, the HMI 14 displays the current position of the vehicle and the route to the destination.

The start switch 15 is a switch for starting the vehicle system 2. Namely, when an occupant is seated in the driver's seat and presses the start switch 15 while depressing the brake pedal, the vehicle system 2 is started.

The control device 16 is configured by one or more electronic control units (ECUs) each including a CPU, a ROM, a RAM, and the like. The CPU executes operation processing according to a program so that the control device 16 executes various types of vehicle control. The control device 16 may consist of one piece of hardware or may consist of a unit including multiple pieces of hardware. Further, the functions of the control device 16 may be at least partially executed by hardware such as an LSI, an ASIC, and an FPGA or may be executed by a combination of software and hardware.

(Control Device 16)

As shown in FIG. 1, the control device 16 includes an external environment recognizing unit 31, an autonomous driving control unit 32 (Advanced Driver-Assistance System, ADAS), a map positioning unit (MPU) 33, and a probe information acquisition unit 34. These components may be configured by separate electronic control units connected with one another via a gateway (central gateway (CGW)). Alternatively, the components may be configured by an integral electronic control unit.

The external environment recognizing unit 31 recognizes target objects present around the vehicle based on the detection result of the external environment sensor 7, and thereby obtains information related to the position and size of each target object. The target objects recognized by the external environment recognizing unit 31 include delimiting lines drawn on the travel road of the vehicle, lanes, roadsides, shoulders, obstacles, etc.

The delimiting lines are lines drawn along the vehicle travel direction. The lanes are regions delimited by one or more delimiting lines. The roadsides are end portions of the travel road of the vehicle. A shoulder is a region between one roadside and the delimiting line adjacent to the roadside in the vehicle width direction. Obstacles include, for example, protective walls (guardrails), utility poles, surrounding vehicles, pedestrians, and so on.

The external environment recognizing unit 31 analyzes the images captured by the external cameras 18 thereby to recognize the positions of the target objects present around the vehicle relative to the vehicle. For example, the external environment recognizing unit 31 may recognize the distance and direction from the vehicle to each target object as viewed from directly above with respect to the vehicle body, by means of a known method such as triangulation method or a motion stereo method. Further, the external environment recognizing unit 31 analyzes the images captured by the external cameras 18 and determine the kind of each target object (for example, a delimiting line, a lane, a roadside, a shoulder, an obstacle, etc.) based on a known method.

The autonomous driving control unit 32 includes an action plan unit 41, a travel control unit 42, and a mode setting unit 43.

The action plan unit 41 creates an action plan for the travel of the vehicle. The action plan unit 41 outputs a travel control signal corresponding to the created action plan to the travel control unit 42.

The travel control unit 42 controls the powertrain 4, the brake device 5, and the steering device 6 based on the travel control signal from the action plan unit 41. Namely, the travel control unit 42 makes the vehicle travel following the action plan created by the action plan unit 41.

The mode setting unit 43 switches the driving mode of the vehicle between a manual driving mode and an autonomous driving mode based on an input to the HMI 14. In the manual driving mode, the travel control unit 42 controls the powertrain 4, the brake device 5, and the steering device 6 to make the vehicle travel in accordance with an input operation performed by the occupant on the operation input member 12 (for example, a steering wheel, an accelerator pedal and/or a brake pedal), while in the autonomous driving mode, an input operation by the occupant on the operation input member 12 is unnecessary, and the travel control unit 42 controls the powertrain 4, the brake device 5, and the steering device 6 to make the vehicle travel autonomously. In other words, the driving automation level of the autonomous driving mode is higher than the driving automation level of the manual driving mode.

The map positioning unit 33 includes a map acquisition unit 51, a map storage unit 52, an own vehicle position identifying unit 53, and a map linkage unit 54.

The map acquisition unit 51 accesses the map server 3 and acquires dynamic map data, which is high accuracy map information, from the map server 3. For example, when the navigation device 11 has set a route, the map acquisition unit 51 preferably acquires the latest dynamic map data of the area corresponding to the route from the map server 3 via the communication device 9.

The dynamic map data is more detailed map data than the map data held in the navigation device 11 and includes static information, semi-static information, semi-dynamic information, and dynamic information. The static information includes three-dimensional map data having higher accuracy than the navigation map data. The semi-static information includes traffic restriction information, road construction information, and wide area weather information. The semi-dynamic information includes accident information, traffic jam information, and narrow area weather information. The dynamic information includes, traffic light information, surrounding vehicle information, and pedestrian information.

The static information (high accuracy map) of the dynamic map data includes information related to the lanes on the travel road (for example, the number of lanes) and information related to the delimiting lines on the travel road (for example, types of the delimiting lines). For example, each delimiting line of the static information is represented by nodes disposed at distances smaller than those between the nodes of the navigation map data and link connecting the nodes.

Besides, each roadway of the static information also is represented by nodes disposed at a prescribed interval (hereinafter, roadway nodes) and links connecting the nodes (hereinafter, roadway links). Each roadway node is created in the middle between a node of the delimiting line set at the left side end of the road and a node of the delimiting line set at the right side end of the road. The nodes of each roadway link are provided at a prescribed interval along the road.

The map storage unit 52 includes one or more storage devices such as an HDD and an SSD and holds various information necessary for autonomous travel of the vehicle in the autonomous driving mode. The map storage unit 52 stores the dynamic map data that the map acquisition unit 51 has acquired from the map server 3.

The own vehicle position identifying unit 53 identifies the position of the vehicle (latitude and longitude) based on the GNSS signal output from the GNSS receiver 10.

Also, the own vehicle position identifying unit 53 uses the detection result of the vehicle sensor 8 (an inertial measurement unit (IMU) or the like) to calculate the movement amount of the vehicle (movement distance and movement direction of the vehicle) by dead reckoning (for example, odometry). The movement amount of the vehicle calculated by dead reckoning will be referred to as a DR movement amount hereinafter. The own vehicle position identifying unit 53 identifies the own vehicle position based on the DR movement amount when the GNSS signal cannot be received, for example. Also, the own vehicle position identifying unit 53 may execute a process of correcting the own vehicle position identified from the GNSS signal based on the DR movement amount thereby to improve the identification accuracy of the own vehicle position.

The map linkage unit 54 extracts, based on a route output from the navigation device 11, a corresponding route from the high accuracy map held by the map storage unit 52 and outputs the extracted route to a localization functional unit.

When the instruction to start autonomous traveling of the vehicle is input, the action plan unit 41 creates a general action plan (for example, lane change, merge, branching, etc.) based on the route extracted by the map linkage unit 54. Thereafter, when the autonomous traveling of the vehicle is started, the action plan unit 41 makes a more detailed action plan (for example, danger avoidance, etc.) based on the general action plan, the own vehicle position identified by the own vehicle position identifying unit 53, the objects recognized by the external environment recognizing unit 31, the high accuracy map held by the map storage unit 52, etc., and the travel control unit 42 controls the travel of the vehicle based on that plan.

The probe information acquisition unit 34 associates the position of the own vehicle identified by the own vehicle position identifying unit 53 based on the GNSS signal with the data detected by at least one sensor of the vehicle sensor 8, the driving operation sensor 13, and the external environment sensor 7, and acquires and holds it as probe information.

(Map Server 3)

Next, description will be made of the map server 3. As shown in FIG. 1, the map server 3 is connected with the control device 16 via a network (the internet in the present embodiment). The map server 3 is a computer provided with a CPU, a ROM, a RAM, and a storage device such as an HDD and an SSD.

The storage device of the map server 3 stores dynamic map data (high accuracy map data). Note that the dynamic map data stored in the storage device of the map server 3 covers a wider area than the dynamic map data stored in the map storage unit 52 of the control device 16. The dynamic map data includes multiple pieces of block data (partial map data) corresponding to the respective blocks (regions) on the map. Each piece of block data preferably corresponds to one of rectangular blocks on the map separated in the latitude direction and the longitude direction.

When the map server 3 receives a request for data from the control device 16 (the map acquisition unit 51) via the communication device 9, the map server 3 transmits a dynamic map corresponding to the requested data to the control device 16. The transmitted data preferably includes traffic jam information, weather information, and the like.

As shown in FIG. 1, the map server 3 includes a dynamic map storage unit 61, a block data transmission unit 62, a probe information management unit 63, and a probe information storage unit 64.

The dynamic map storage unit 61 is constituted of a storage device and stores dynamic map of an area wider than the regions in which the vehicle travels. The block data transmission unit 62 is configured to receive a transmission request of specific piece(s) of block data from the vehicle and transmits the piece(s) of block data corresponding to the transmission request to the vehicle.

The probe information management unit 63 receives the probe information which is transmitted from the vehicle at appropriate times. The probe information storage unit 64 stores and holds the probe information acquired by a probe information reception unit. The probe information management unit 63 performs appropriate statistical processing and the like based on the probe information held by the probe information storage unit 64 and performs an update process to update the dynamic map.

In the following, an update method of the dynamic map data executed by the map acquisition unit 51 will be described. The map acquisition unit 51 executes the update method of the dynamic map data in both of an operating state of the vehicle system 2 (vehicle) in which the start switch 15 is ON and a sleep state of the vehicle system 2 (vehicle) in which the start switch 15 is OFF.

Figure 2:
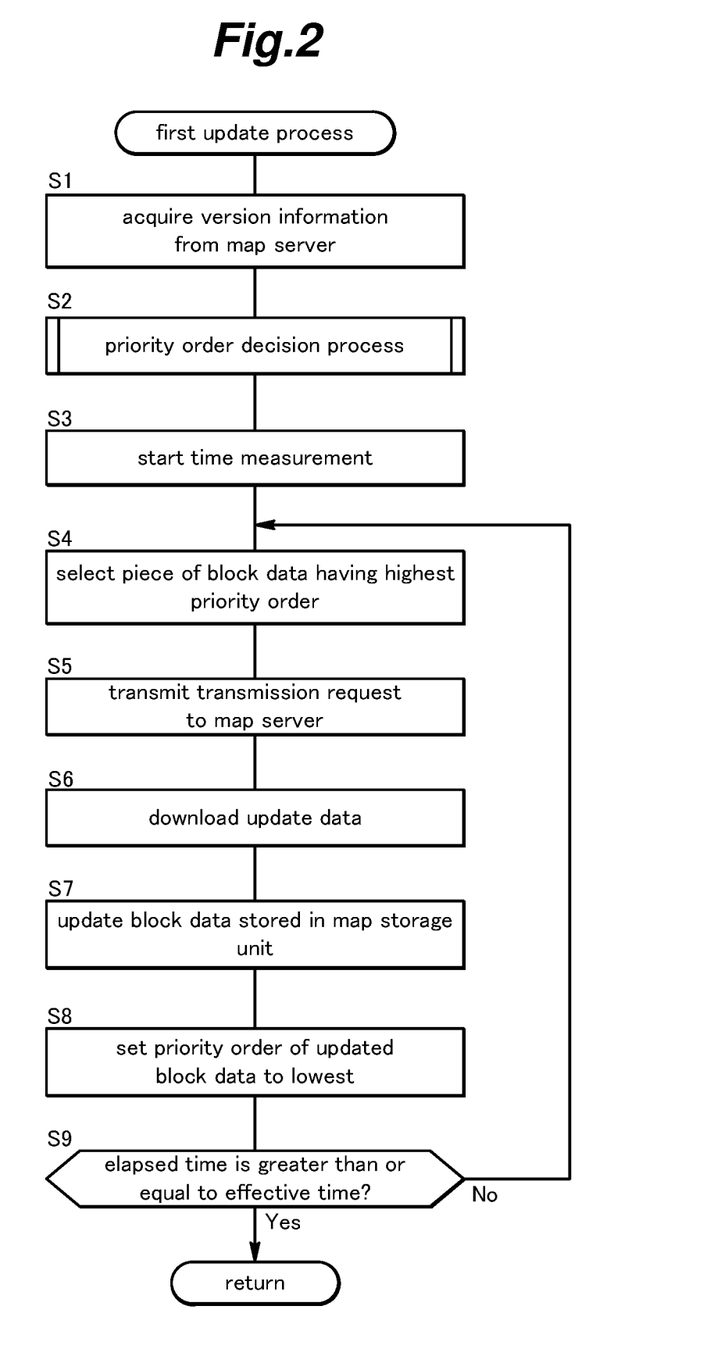
FIG. 2 is a flowchart showing a procedure of a first update process executed by the map information system.

When the vehicle system 2 is in the operating state, the map acquisition unit 51 executes a first update process shown in FIG. 2 at a prescribed time interval. In the first update process, the map acquisition unit 51 first communicates with the map server 3 via the network and acquires the latest version information of the dynamic map (S1). The version information is given to each piece of block data. The map acquisition unit 51 may acquire the version information corresponding to multiple blocks within a prescribed distance from the own vehicle position.

Subsequently, the map acquisition unit 51 decides priority orders of pieces of block data of the dynamic map data (the high accuracy map data) to be updated, based on at least one of the position of the own vehicle, the route to the destination, and a passage history (S2). At this time, the map acquisition unit 51 preferably decides the priority orders by taking into account the version information.

Preferably, the priority orders of the pieces of block data to be updated are set based on various criteria. For example, it is preferable if the priority orders are set based on the route to the destination set by the navigation device 11 such that priority orders of multiple pieces of block data corresponding to blocks (regions) including the route to the destination are high. Also, it is preferable if the priority orders of the multiple pieces of block data corresponding to the blocks including the route to the destination are set such that a piece of block data corresponding to a region nearer to the position of the own vehicle is given a higher priority order. Note that as the position of the own vehicle, the position acquired by the own vehicle position identifying unit 53 may be preferably used.

Also, it is preferable if the priority orders are set based on the past passage history stored by the navigation device 11 such that a piece of block data corresponding to a block with a higher passage frequency is given a higher priority order. The passage history may be position data of the own vehicle acquired at a prescribed time interval. In this case, it is preferable if a piece of block data corresponding to a block including a larger number of points where the own vehicle was present in the past is given a higher priority order. By limiting the passage history to a time period between the present time and a time point preceding the present time by a prescribed time, it is possible to increase the influence of the recent passage history on the priority order.

Also, it is preferable if, based on the position of the own vehicle, higher priority orders are set for the pieces of block data corresponding to the blocks nearer to the position of the own vehicle. The priority orders may be set based on the direction of the own vehicle. For example, preferably, the priority orders of the pieces of block data corresponding to the blocks positioned in front of the own vehicle with respect to the traveling direction of the own vehicle are set higher than the priority orders of the pieces of block data corresponding to the blocks positioned behind the own vehicle with respect to the traveling direction of the own vehicle. The direction of the own vehicle is preferably acquired based on the temporal change of the position of the own vehicle.

Also, since the pieces of block data of the latest version do not need to be updated, the priority orders of them should be set at the lowest. Whether each piece of block data is the latest version is preferably determined by comparing the latest version information acquired from the map server 3 with the version information of each piece of block data stored in the map storage unit 52. Null should be set as the version information of the pieces of block data that are not stored in the map storage unit 52.

Figure 3:
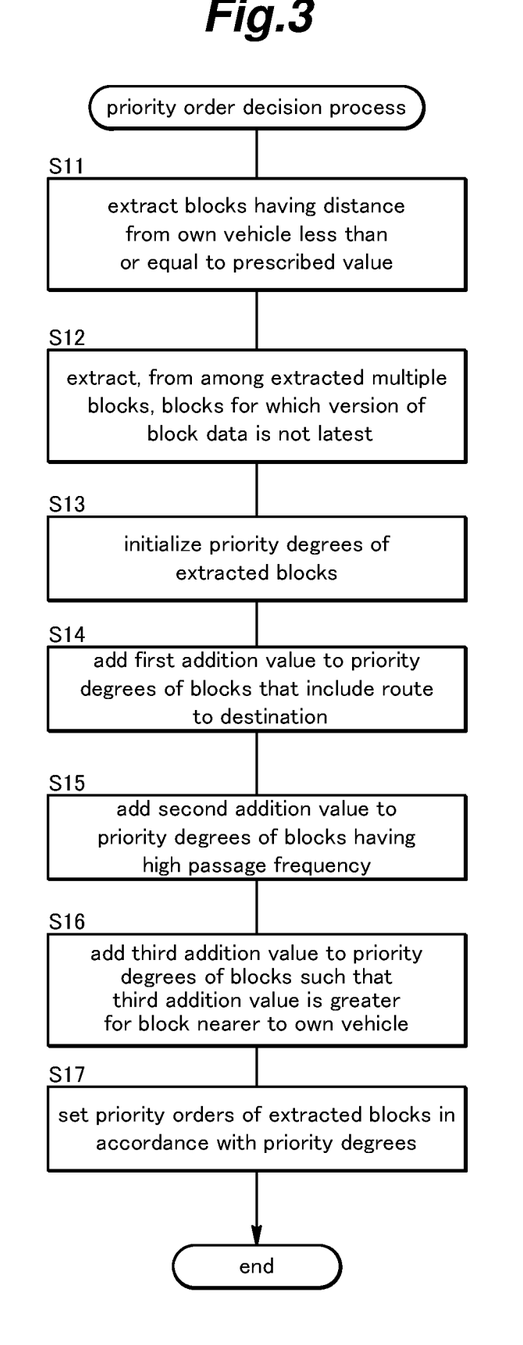
FIG. 3 is a flowchart showing a procedure of a priority order decision process executed by the map information system.

The map acquisition unit 51 preferably decides the priority orders of the pieces of block data to be updated by performing a priority order decision process shown in FIG. 3, for example. First, based on the position of the own vehicle, the map acquisition unit 51 extracts multiple blocks having a distance from the own vehicle less than or equal to a prescribed value (S11).

Next, the map acquisition unit 51 extracts, from among the extracted multiple blocks, blocks for which the version of the corresponding pieces of block data is not the latest (S12). Namely, the map acquisition unit 51 determines whether update is necessary based on the version information of each piece of block data stored in the map storage unit 52 and the version information of each piece of block data stored in the map server 3.

Then, the map acquisition unit 51 initializes (or make zero) the priority degrees of the multiple blocks extracted in step S12 (S13).

Subsequently, the map acquisition unit 51 adds a first addition value to the priority degrees of those of the multiple blocks that are determined to include the route to the destination based on the route to the destination (S14). The first addition value preferably is a prescribed value. Then, the map acquisition unit 51 adds a second addition value to the priority degrees of those of the multiple blocks that are determined to have a high passage frequency in the past based on the passage history (S15). The second addition value preferably is a value obtained by multiplying a prescribed value by the passage frequency of each block, for example. Next, the map acquisition unit 51 adds a third addition value to the priority degrees of the multiple blocks, where the third addition value is greater for the block nearer to the position of the own vehicle (S16). Preferably, the third addition value is obtained by dividing a prescribed value by the distance between the position of the own vehicle and each block. Then, the map acquisition unit 51 sets the priority orders of the pieces of block data in accordance with the calculated priority degrees such that the piece of block data corresponding to the highest priority degree is given the highest priority order and the priority order decreases as the priority degree decreases (S17).

By changing the first addition value, the second addition value, and the third addition value, the influence of the route to the destination, the passage history, and the distance from the own vehicle on the priority orders can be changed. For example, if it is desired that the influence on the priority orders is high in the order of the route to the destination, the passage history, and the distance from the own vehicle, the first, second, and third addition values should be set such that the first addition value is greater than the maximum value of the second addition value and the minimum value of the second addition value is greater than the maximum value of the third addition value.

As shown in FIG. 2, after deciding the priority orders of the pieces of block data to be updated in step S1, the map acquisition unit 51 initializes the measurement time to zero and starts the time measurement to measure the period in which the priority orders are effective (S3).

Next, based on the priority orders, the map acquisition unit 51 selects the piece of block data having the highest priority order (S4). Then, the map acquisition unit 51 generates a transmission request corresponding to the piece of block data with the highest priority order, and transmits the transmission request to the map server 3 via the network (S5). Each piece of block data stored in the map storage unit 52 includes the version information that indicates the novelty of the piece of block data. The transmission request includes information for identifying the own vehicle, an identification number for identifying the target piece of block data, and the version information of the target piece of block data.

Upon receipt of the transmission request, the block data transmission unit 62 of the map server 3 transmits update data of the target piece of block data to the vehicle system 2 in accordance with the transmission request. The update data may be the latest version of the piece of block data stored in the dynamic map storage unit 61 or difference data for changing the piece of block data stored in the vehicle system 2 to the latest version. Preferably, the block data transmission unit 62 identifies the difference data corresponding to the transmission request based on the version information included in the transmission request and the latest version information. By performing update using the difference data, the amount of communication can be reduced.

The map acquisition unit 51 downloads the update data of the target piece of block data from the map server 3 (S6), and updates the corresponding piece of block data stored in the map storage unit 52 according to the downloaded update data (S7).

After performing update of the target piece of block data, the map acquisition unit 51 sets the priority order of the target piece of block data to the lowest (S8). Then, the map acquisition unit 51 determines whether the elapsed time is greater than or equal to a prescribed effective time (S9). The effective time is set as a period in which the priority orders set in step S1 are effective. When the elapsed time is greater than or equal to the effective time (the determination result of S9 is Yes), the map acquisition unit 51 executes the first update process again from step S1 to update the priority orders. When the elapsed time is less than the effective time (the determination result of S9 is No), the map acquisition unit 51 repeats steps S4 to S8. Thereby, the update is performed in order starting from the piece of block data with the highest priority order.

When the map acquisition unit 51 determines, while downloading the update data, that, based on the position of the own vehicle, the own vehicle will not travel in the region (block) corresponding to the update data that is being downloaded within a prescribed time period from the present time, the map acquisition unit 51 may cancel the download of the update data that is being downloaded. For example, when the block corresponding to the update data that is being downloaded does not include the route to the destination and is positioned behind the own vehicle with respect to the direction of the own vehicle, the map acquisition unit 51 may cancel the download. By stopping the download of the update data that is determined not to be used, it is possible to maintain the free space of the map storage unit 52.

According to the first update process executed by the map acquisition unit 51, the pieces of block data to be updated are selected based on at least one of the position of the own vehicle, the route to the destination, and the passage history, and therefore, it is possible to reduce the size of the partial map data stored in the map storage unit 52. Particularly, when the map data is a dynamic map having a large data size, it is possible to increase the reduction amount of data stored in the map storage unit 52.

Figure 4:
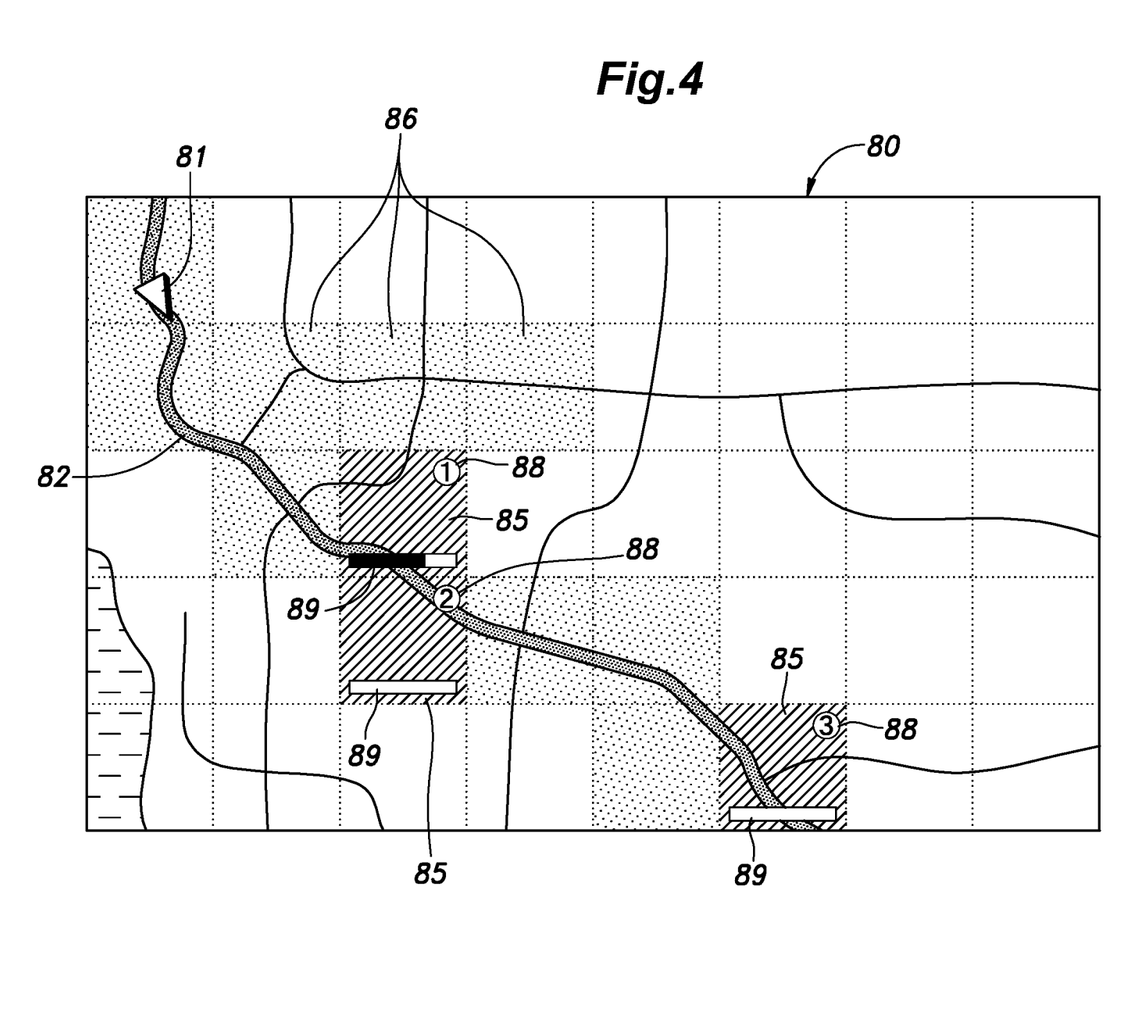
FIG. 4 is an example of a map image displayed on a touch panel at the time of update of the map data.

The map acquisition unit 51 executes an update display process during the execution of the first update process. In the update display process, the map acquisition unit 51 causes a touch panel 23, which is a display of the map information system 1, to display a map image 80 that shows the blocks (regions) corresponding to the pieces of block data (partial map data) for which the update process is being executed or is planned to be executed in a manner distinguishable from the other regions. Also, the map information system 1 may display the map image 80 on the display of the user's mobile terminal such as a smartphone.

Preferably, the map acquisition unit 51 causes the touch panel 23 to display the map image 80 shown in FIG. 4, for example. The map image 80 is preferably displayed by being combined with the route guide image that is caused to be displayed on the touch panel 23 by the navigation device 11. In the map image 80, a cursor 81 representing the position of the own vehicle and a route 82 to the destination are displayed. Also, the map image 80 may be displayed independently of the route guide image that is caused to be displayed on the touch panel 23 by the navigation device 11. In this case, the touch panel 23 preferably switches the image displayed thereon in response to a touch operation by the user between the route guide image and the map image 80 showing only the update progress. In the present embodiment, the map acquisition unit 51 displays the map image 80 showing the update progress combined with the route guide image.

Preferably, the map acquisition unit 51 puts first display 85 on the blocks corresponding to the pieces of block data for which the download and update are being executed or the download and update are planned to be executed, puts second display 86 on the blocks having latest pieces of block data, and does not put additional display on the blocks for which there is no plan to download, for example. The first and second displays 85, 86 may be symbols or colors. Preferably, the map acquisition unit 51 displays the map image 80 in which the blocks corresponding to the pieces of block data for which the update process is being executed or is planned to be executed are shown in a color different from the color of the other blocks. Namely, the first display 85 and the second display 86 are given different colors. Thereby, from the map image 80 displayed on the touch panel 23, the user can recognize the blocks for which the update is being executed or is planned to be executed, the blocks having the latest pieces of block data (including the blocks for which the update has completed), and the blocks for which there is no plan to update.

As shown in FIG. 4, in the map image 80 displayed on the touch panel 23, the map acquisition unit 51 preferably displays an order display 88 that indicates an order in the update process on each of the blocks corresponding to the pieces of the block data for which the update process is being executed or is planned to be executed. The order display 88 is a numerical value indicating the order in the update process and may be the priority order decided in the priority order decision process. With the order display 88, the user can recognize the order in the update process.

Also preferably, in the map image 80 displayed on the touch panel 23, the map acquisition unit 51 displays a progress display 89 on each of the blocks corresponding the pieces of block data for which the update process is being executed or is planned to be executed. The progress display 89 includes numerical value or figure indicating the progress rate of the update process of the corresponding piece of block data, and preferably is a bar graph corresponding from 0% to 100%, for example. By viewing the progress display 89, the user can recognize the update status of each piece of block data.

Figure 5:
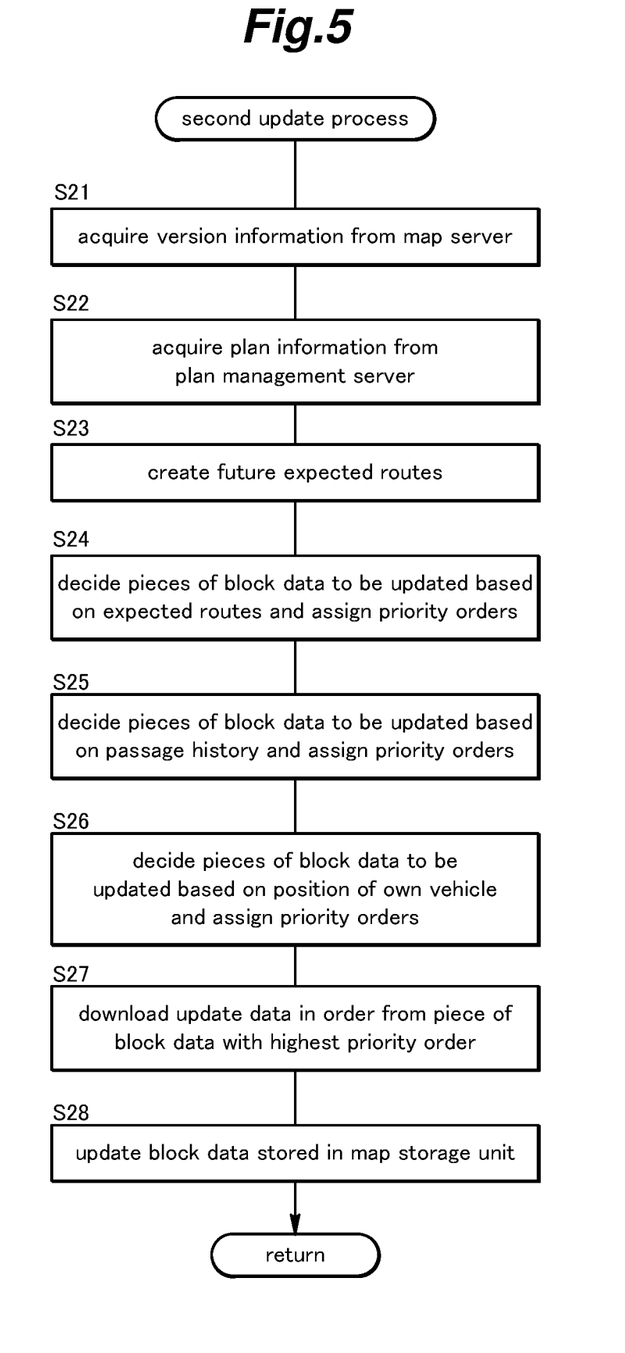
FIG. 5 is a flowchart showing a procedure of a second update process executed by the map information system.

When the vehicle system 2 (vehicle) is in the sleep state, the map acquisition unit 51 executes a second update process at a prescribed time interval. In the second update process, the map acquisition unit 51 decides the pieces of block data to be updated based on at least one of the passage history and future expected routes. Then, the map acquisition unit 51 communicates with the map server 3, downloads the latest pieces of block data from the map server 3 that correspond to the pieces of block data to be updated, and updates the map data stored in the map storage unit 52 based on the downloaded pieces of block data.

Preferably, the map acquisition unit 51 communicates via the network with a plan management server 71 that stores plan information of multiple users to acquire plan information of a target user, and decides future expected routes based on the acquired plan information. By using an application in the mobile terminal or the personal computer, each user can rewrite the plan information stored in the plan management server 71. Each piece of plan information is configured by a record including, for example, the user ID, date and time, place, content, etc.

Preferably, the map acquisition unit 51 communicates with the plan management server 71 and acquires pieces of plan information of the target user based on the user ID. Preferably, the map acquisition unit 51 extracts, from each of the acquired pieces of plan information, the date and time and the place, and based on the extracted date and time and place, creates the expected route on the date and time. The map acquisition unit 51 may limit the target pieces of plan information based on the date and time included in each piece of plan information. Preferably, the map acquisition unit 51 creates the expected route for each of the pieces of plan information having a date and time included in a prescribed period from the date and time at which the second update process is executed.

Preferably, the map acquisition unit 51 creates the expected route by setting the place included in each piece of plan information as the destination and the current position of the own vehicle as the departure place. Also, the map acquisition unit 51 may set the place included in each piece of plan information as the destination and the current position of the own vehicle as the departure place and output the destination and the departure place to the navigation device 11 to make the navigation device 11 create the future expected route.

In the following, the second update process will be described in detail with reference to FIG. 5. In the second update process, the map acquisition unit 51 first communicates with the map server 3 via the network and acquires the latest version information of the dynamic map (S21).

Then, the map acquisition unit 51 communicates with the plan management server 71 and acquires the pieces of plan information of the target user from the plan management server 71 (S22). The map acquisition unit 51 creates future expected routes based on the pieces of plan information of the user (S23).

Subsequently, the map acquisition unit 51 decides the pieces of block data to be updated based on the created expected routes and decides the priority orders for update (S24). For example, the map acquisition unit 51 extracts the blocks including any of the created expected routes. Then, with regard to the extracted blocks, the map acquisition unit 51 compares the version information of each piece of block data stored in the map storage unit 52 with the latest version information of each piece of block data acquired from the map server 3 and excludes the blocks for which the latest version block data has been already acquired. Thereafter, the map acquisition unit 51 assigns a priority order for update to each of the extracted blocks in order starting from the block nearest to the position of the vehicle. Thereby, the blocks which include any of the expected routes and whose block data is not the latest version are assigned the priority orders such that a higher priority order is assigned to the block nearer to the position of the own vehicle.

Subsequently, the map acquisition unit 51 decides the pieces of block data to be updated based on the passage history and decides the priority orders for update (S25). For example, based on the passage history, the map acquisition unit 51 extracts the blocks in which the passage frequency is greater than or equal to a first determination value. The first determination value is set to determine that the passage frequency is relatively high. In another embodiment, the map acquisition unit 51 may extract the blocks in which the passage frequency is greater than or equal to the first determination value and which are located within a prescribed distance from the own vehicle. Then, with regard to the extracted blocks, the map acquisition unit 51 compares the version information of each piece of block data stored in the map storage unit 52 with the latest version information of each piece of block data acquired from the map server 3 and excludes the blocks for which the latest version block data has been already acquired. Thereafter, the map acquisition unit 51 assigns a priority order for update to each of the extracted blocks in order starting from the block nearest to the position of the own vehicle. Thereby, the blocks in which the passage frequency is greater than or equal to the first determination value and whose block data is not the latest version are assigned the priority orders such that a higher priority order is assigned to the block nearer to the position of the own vehicle. The highest priority order assigned in step S25 is set lower than the lowest priority order assigned in step S24.

Subsequently, the map acquisition unit 51 decides the pieces of block data to be updated based on the position of the own vehicle and decides the priority orders for update (S26). For example, based on the position of the own vehicle, the map acquisition unit 51 extracts, as the pieces of block data to be updated, the pieces of block data corresponding to the blocks located within a prescribed distance from the position of the own vehicle. Then, with regard to the extracted blocks, the map acquisition unit 51 compares the version information of each piece of block data stored in the map storage unit 52 with the latest version information of each piece of block data acquired from the map server 3 and excludes the blocks for which the latest version block data has been already acquired. Thereafter, the map acquisition unit 51 assigns a priority order for update to each of the extracted blocks in order starting from the block nearest to the position of the own vehicle. Thereby, the blocks which are located within the prescribed distance from the own vehicle and whose block data is not the latest version are assigned the priority orders such that a higher priority order is assigned to the block nearer to the position of the own vehicle. The highest priority order assigned in step S26 is set lower than the lowest priority order set in step S25.

Subsequently, the map acquisition unit 51 communicates with the map server 3 and outputs a transmission request for update data corresponding to each piece of block data to the map server 3 in order from the piece of block data with the highest priority order, and downloads the update data corresponding to each piece of block data from the map server 3 (S27). Then, the map acquisition unit 51 updates the pieces of block data stored in the map storage unit 52 based on the downloaded update data (S28).

According to the second update process, since the map acquisition unit 51 performs update of the map data when the vehicle is in the sleep state, the update process can be performed in good time. Thereby, the map information system 1 can prepare the map data necessary for the travel of the vehicle by the time when the travel of the vehicle is started. Since the map acquisition unit 51 decides the pieces of block data to be updated based on the plan information, the pieces of block data necessary for the next travel can be prepared beforehand. Also, since the map acquisition unit 51 decides the pieces of block data to be updated based on the passage history, the pieces of block data of the regions in which the vehicle may travel can be prepared by the time the next travel is started. In addition, since the map acquisition unit 51 decides the pieces of block data to be updated based on the position of the own vehicle, the pieces of block data of the regions in which the vehicle may travel can be prepared by the time the next travel is started.

In the second update process, the future expected route may be set based on a planned destination input by the user beforehand. Preferably, the planned destination is input via the touch panel 23 operated by the user and is stored in the storage device of the navigation device 11 or the control device 16. Preferably, multiple planned destinations are stored in the storage device of the navigation device 11 or the control device 16.

Figure 6:
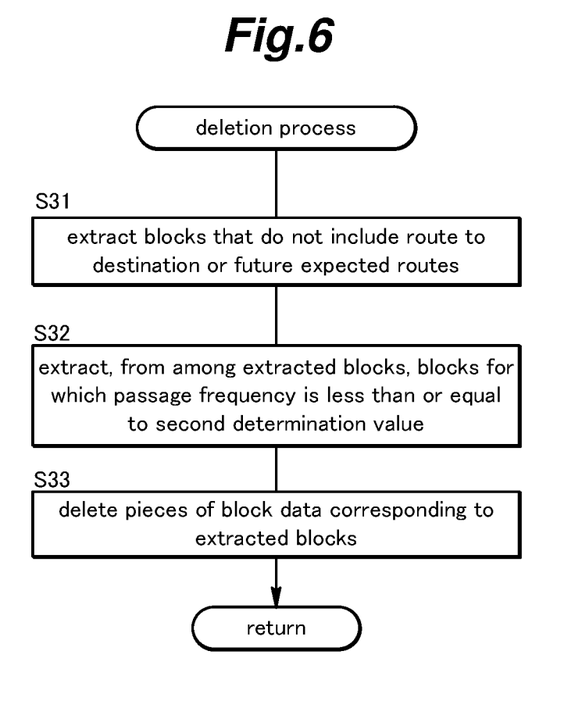
FIG. 6 is a flowchart showing a procedure of a deletion process executed by the map information system.

The map acquisition unit 51 executes a deletion process at a prescribed time interval in the operating state and the sleep state of the vehicle. In the deletion process, the pieces of block data whose frequency of use in the future is estimated to be low are deleted, whereby the remaining space of the map storage unit 52 increases.

Preferably, based on the passage history, the map acquisition unit 51 deletes the pieces of block data corresponding to the blocks in which the passage frequency is less than or equal to a prescribed second determination value. The second determination value is set to determine that the passage frequency is low. The passage history may be position data of the own vehicle acquired at a prescribed time interval. In this case, the pieces of block data corresponding to blocks including a small number of points where the own vehicle was present in the past are deleted. By limiting the passage history to a time period between the present time and a time point preceding the present time by a prescribed time, it is possible to delete the pieces of block data based on the recent passage frequency.

Also preferably, based on the passage history, the map acquisition unit 51 deletes the pieces of block data corresponding to the map regions in which the passage frequency is less than or equal to the second determination value and which do not include the route to the destination.

Preferably, the map acquisition unit 51 executes the deletion process in accordance with the procedure shown in FIG. 6, for example. In the deletion process, the map acquisition unit 51 first extracts the blocks that do not include the route to the destination or future expected routes (S31).

Subsequently, based on the passage history, the map acquisition unit 51 extracts, from among the blocks extracted in step S31, blocks in which the passage frequency is less than or equal to the second determination value (S32). The second determination value may be varied depending on the distance between the position of the own vehicle and the block. For example, it is preferable to increase the second determination value as the distance between the position of the own vehicle and the block increases. Thereby, blocks distant from the position of the own vehicle become more likely to be extracted.

Subsequently, the map acquisition unit 51 deletes the pieces of block data corresponding to blocks extracted in step S32 (S33).

According to the deletion process, it is possible to increase the remaining space of the map storage unit 52 by deleting the pieces of block data that are likely not to be used. In another embodiment, the second determination value may be varied depending on the remaining space of the map storage unit 52. For example, it is preferable to increase the second determination value as the remaining space of the map storage unit 52 decreases. Thereby, as the remaining space of the map storage unit 52 decreases, the pieces of block data become easier to be deleted.

Concrete embodiments of the present invention have been described in the foregoing, but the present invention is not limited to the above embodiments and may be modified or altered in various ways.

The invention claimed is:

1. An update method of map data executed by a map information system provided in a vehicle, wherein
the map data includes multiple pieces of block data separated so as to correspond to blocks on a map and stored in a storage device of the map information system, and
wherein the map information system
decides priority orders of pieces of block data to be updated based on at least one of a position of an own vehicle, a route to a destination, and a passage history,
communicates with a map server having a latest version of the map data and downloads update data of the pieces of block data to be updated from the map server in accordance with the priority order,
updates the pieces of block data stored in the storage device based on the downloaded update data, and
when, during download of a piece of block data, a corresponding block does not include the route to the destination and is positioned behind the own vehicle with respect to the direction of the own vehicle, the map information system cancels the download of the piece of block data that is being downloaded, the corresponding block being a block corresponding to the update data that is being downloaded.

2. The update method of map data according to claim 1, wherein the map data is a high accuracy map including lane information.

3. The update method of map data according to claim 2, wherein the map information system deletes, based on the passage history, pieces of block data corresponding to map regions in which a passage frequency is less than or equal to a prescribed determination value.

4. The update method of map data according to claim 2, wherein the map information system deletes, based on the passage history, pieces of block data corresponding to map regions in which a passage frequency is less than or equal to a prescribed determination value and which do not include the route to the destination.

5. The update method of map data according to claim 1, wherein each piece of block data includes version information, and
the map information system determines necessity of update based on the version information of the pieces of block data stored in the storage device and the version information of the pieces of block data stored in the map server and performs download from the map server when it is determined that the update is necessary.

6. A map information system comprising:
a storage device that stores map data including multiple pieces of block data separated so as to correspond to blocks on a map; and
a map acquisition unit that decides priority orders of pieces of block data to be updated based on at least one of a position of an own vehicle, a route to a destination, and a passage history, communicates with a map server having a latest version of the map data, downloads latest pieces of block data from the map server in accordance with the priority orders, and updates the pieces of block data stored in the storage device based on the downloaded pieces of block data, wherein when, during download of a piece of block data, a corresponding block does not include the route to the destination and is positioned behind the own vehicle with respect to the direction of the own vehicle, the map acquisition unit cancels the download of the piece of block data that is being downloaded, the corresponding block being a block corresponding to the update data that is being downloaded.

\* \* \* \* \*